(12) United States Patent
Slawitschka et al.

(10) Patent No.: US 7,035,643 B2
(45) Date of Patent: Apr. 25, 2006

(54) METHOD FOR PLANNING MOBILE RADIO COVERAGE INSIDE BUILDINGS

(75) Inventors: Laslo Slawitschka, Bonn (DE); Gabriel Zgunea, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 511 days.

(21) Appl. No.: 10/257,016

(22) PCT Filed: Apr. 10, 2001

(86) PCT No.: PCT/DE01/01377
§ 371 (c)(1),
(2), (4) Date: Nov. 14, 2002

(87) PCT Pub. No.: WO01/80468
PCT Pub. Date: Oct. 25, 2001

(65) Prior Publication Data
US 2004/0180665 A1  Sep. 16, 2004

(30) Foreign Application Priority Data
Apr. 13, 2000  (DE) ........................................ 100 18 439

(51) Int. Cl.
*H04Q 7/20* (2006.01)

(52) U.S. Cl. ........................ 455/446; 455/62; 455/63.2; 455/67.11; 455/67.14; 455/423; 455/424; 455/422.1

(58) Field of Classification Search ................. 455/446, 455/62, 63.2, 67.11, 67.14, 423–424
See application file for complete search history.

(56) References Cited

U.S. PATENT DOCUMENTS

| | | | | |
|---|---|---|---|---|
| 5,450,615 A | * | 9/1995 | Fortune et al. | 455/67.16 |
| 5,561,841 A | * | 10/1996 | Markus | 455/446 |
| 5,987,328 A | * | 11/1999 | Ephremides et al. | 455/446 |
| 6,317,599 B1 | * | 11/2001 | Rappaport et al. | 455/446 |
| 6,356,758 B1 | * | 3/2002 | Almeida et al. | 455/446 |
| 6,678,525 B1 | * | 1/2004 | Baranger et al. | 455/446 |

FOREIGN PATENT DOCUMENTS

DE  197 03 916  8/1998

OTHER PUBLICATIONS

Fortune, S.J. et al.: "Wise Design of Indoor Wireless Systems: Practical Computation and Optimization", IEEE Computer Society, US, vol. 2, 1995, pp. 58–68.
Tornevik, C. et al.: "Propogation Models, Cell Planning and Channel Allocation for Indoor Applications of Cellular Systems", Proceedings of the Vehicular Technology Conference, New York, May 18–20, 1993.
Murch, R.D. et al.: "Improved Empirical Modeling for Indoor Prapogation Prediction", Proceedings of the Vehicular Technology Conference, Jul. 25–28, 1995.

* cited by examiner

*Primary Examiner*—William Trost
*Assistant Examiner*—Sharad Rampuria
(74) *Attorney, Agent, or Firm*—Baker & Daniels (57) ABSTRACT

The invention relates to a method for planning radio coverage and for predicting the high-frequency received power level of a mobile radio transmitter in buildings for a number of floors above and below the floor in which the transmitter is positioned with a transmitting antenna. The method can be used for the most frequently existing building types, i.e. reinforced concrete framework buildings and masonry buildings. The invention is advantageous in that a complex series of measurements for planning the radio coverage in buildings can be forgone. In addition, no complex calculations using semi-emperical models, e.g. ray tracing methods, are necessary. The inventive method offers rapid adequately precise results concerning the radio coverage to be expected in a building and, at the same time, for a large number of floors.

17 Claims, 9 Drawing Sheets

FIG_1

FIG_2

FIG_6

FIG. 7

FIG_8

METHOD FOR PLANNING MOBILE RADIO COVERAGE INSIDE BUILDINGS

The invention relates to a method for planning mobile radio coverage inside buildings, especially using a prediction method for the high-frequency received power level in the building when the transmitting antenna covering the building is disposed inside the building.

With the Maxwellian equations, the electromagnetic wave propagation can be analytically described in such a case, provided that the initial values and limit values are available.

DE 197 03 916 A1 describes a method for predicting the building attenuation or the high-frequency received power level inside a building with mobile radio systems, which is based on the assumption that the transmitting antenna is disposed outside the building.

With a wave propagation in buildings where the transmitting antenna is disposed inside the building the building structures are so complex that the initial values for the Maxwellian equations cannot be determined. Therefore, in this case, no closed solution exists for said equations.

With the methods for predicting the high-frequency received power level in buildings available at this time, the so-called semi-empirical models, the high-frequency received power level can be predicted only on the floor on which the transmitting antenna is located and only in its immediate vicinity.

The article by S. J. Fortune et al: "WISE Design of Indoor Wireless Systems: Practical Computation and Optimization" in IEEE Computational Science & Engineering, IEEE Computer Society, US, vol. 2, No. 1, 1995, pages 58–68, ISSN 1070-9924 describes a method for planning the mobile radio coverage inside a building to be covered which is based on computer-aided simulation. A virtual transmitting antenna with certain predefined transmitting parameters is positioned at any available location inside the building. First, the dimensions and positions of all walls, ceilings and floors inside the building must be collected. Based on said data, a propagation model is prepared and the expected coverage area of the antenna is calculated by means of a ray tracing method. If the calculated coverage area does not cover the entire building, the process is repeated with different transmitting parameters for the virtual antenna or by positioning another virtual antenna. The disadvantage of said prediction method is the complex collection of all building dimensions, i.e. wall, ceiling and floor areas, and the calculation of a propagation model for the ray tracing method.

The aim of the invention is to provide a method for planning mobile radio coverage inside buildings with which the high-frequency received power level can be predicted rapidly and with adequate accuracy at any place in the building without having to prepare complex propagation models.

The problem is solved by means of the features of the independent patent claims.

With the planning method of the invention which is based on a method of approximation for determining the high-frequency received power to be expected, the GSM radio coverage can be planned on the floors of a building. The GSM transmitters required for coverage are housed in the building. Planning the coverage includes the following steps:

A transmitter (with the transmitting antenna) is positioned in a place located in the building to be covered.

The size of the useful cell (coverage area) inside the building is determined with the approximation method of the invention. If the coverage is not adequate, tests will be carried out to determine whether the coverage area can be expanded to include the entire building by changing the transmitting parameters.

If coverage is not feasible with one transmitter, a second transmitter is positioned in an appropriate location. Then, the size of the useful cell (coverage area) is also determined for said second transmitter.

Full coverage for the building is obtained in that the above described method is repeated, possibly several times.

In many cases it was found that radio coverage for a building is possible with only one transmitter.

By means of the invention, radio planning and prediction of the high-frequency received power level in a downlink in buildings is possible with . . . adequate accuracy up to six floors above and below the floor on which the transmitting antenna is positioned. The transmitter can be positioned anywhere in the building. The method can be used for the most frequently existing building types, i.e. reinforced concrete framework buildings and masonry buildings.

The advantage of the invention is that no complex series of measurements are required for planning the radio coverage in buildings. In addition, no complex calculations using semi-empirical models, such as ray tracing methods, are necessary. The proposed method rapidly delivers adequately accurate results concerning the radio coverage to be expected in a building and at the same time, for a large number of floors. Except for a few building parameters, such as the building dimensions, among others, no other input parameters are required for performing the method.

Advantageous embodiments and further developments of the invention are described in the dependent patent claims.

Figure 1:
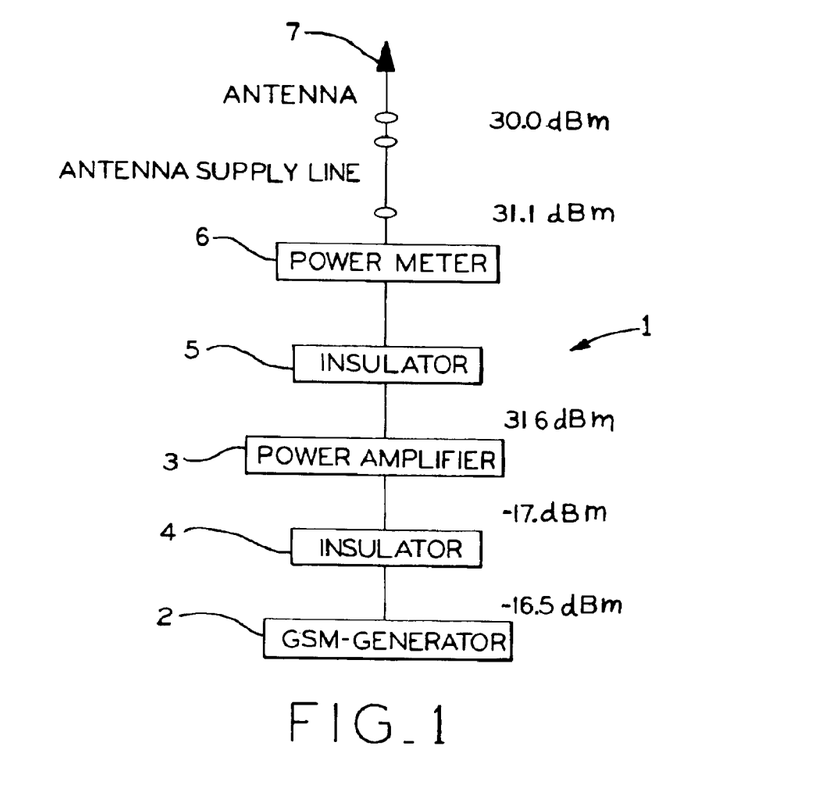
FIG. 1: potential structure of a measuring generator for taking measurements inside a building.
Figure 2:
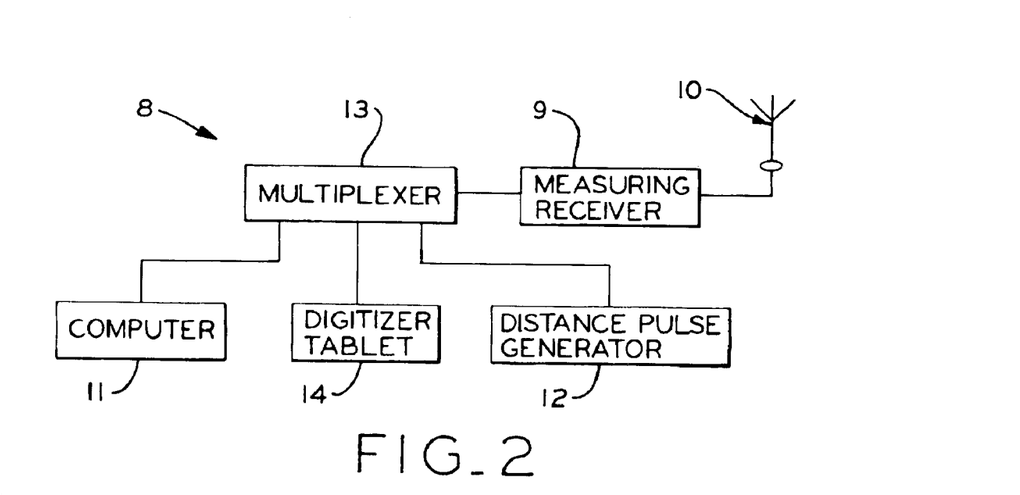
FIG. 2: potential structure of a mobile measuring receiver for taking measurements inside a building.
Figure 3:
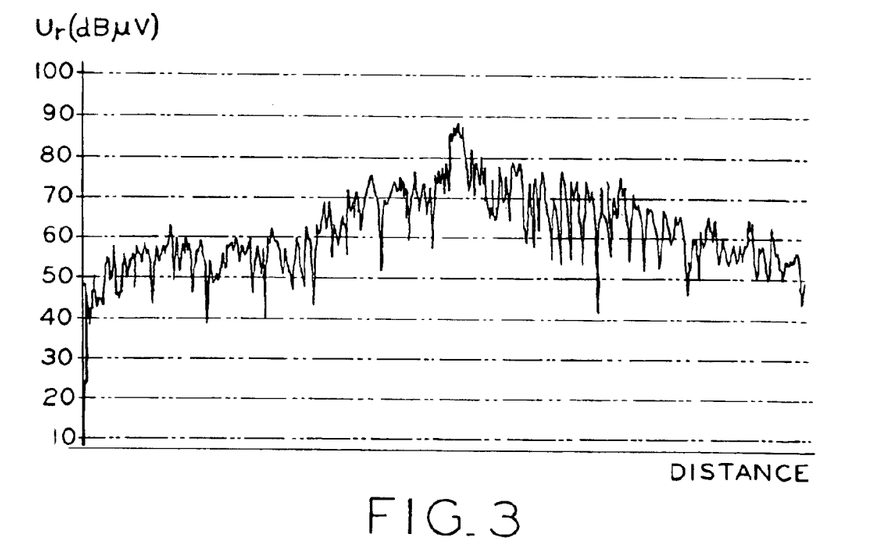
FIG. 3: illustration of a typical high-frequency receiving voltage level in dependence of the covered distance.

The invention is described in more detail below by means of an exemplary embodiment, including references to the drawings. The drawings and the description of the drawings include further features and advantages of the invention. The drawings show the following:

FIGS. 1 to 3 illustrate a typical measuring system for taking measurements inside a building. The measuring system consists of a measuring generator and a mobile measuring receiving system.

The measuring generator of FIG. 1 supplies a GMSK-modulated transmitted signal. The level values are shown at the output of each individual stage where $P_r=1$ W. The downlink radio channels used for the measurements are GSM measuring channels. The power amplifier 3 amplifies the input signal of the GSM generator 2 by approx. 48 dB. The insulators 4, 5 at the output of the signal generator 2 and the power amplifier 3 are responsible for a good impedance match. The reflected signals are suppressed with at least 20 dB so as to prevent the development of interfering intermodulation products, especially on the non-linear transfer characteristic of the amplifier output stage. The insulator 5 can be connected to a power meter 6.

The transmitting antenna 7 is a vertically polarized $\lambda/2$-dipole. The half-width on the vertical plane is 78°. The antenna gain is 2 dBi in the frequency range between 870 and 960 MHz. The standing-wave ratio at the antenna input is approx. 1.15.

The level of the antenna base of the transmitting antenna is set to 1.67 m above ground.

According to FIG. 2, the high-frequency receiving voltage level ($U_r$ in dBµV) is detected by means of a mobile measuring receiving system 8. The measuring accuracy is around ±1.5 dB in the level range between −10 dBµV and +60 dBµV.

The measuring receiver 9 has the same antenna 10 at the same level above ground as the transmitter. The high-frequency useful bandwidth of the receiver 9 is between 0.4 GHz and 1 GHz. The intermediate frequency bandwidth is $B_0$=120 KHz.

The measuring system supplies 200 measured values per second from which arithmetic mean values are formed at distances of 0.15 m. The measured data are collected by a computer 11. A path pulse generator 12 supplies the pulses for the averaging distance. The function of the multiplexer 13 is that of a central processing unit. By means of a digitizer tablet 14 the measured data can be allocated to the measuring route.

The measuring generator 1 should be positioned at mid-building height (mid-level floor), if possible, at a suitable available location.

The levels are measured with the mobile measuring receiver 8 in every unit of area of the floors, if possible. FIG. 3 shows an example of a typical diagram of the high-frequency receiving voltage $U_r$ along a measured section. The covered measured section is determined by means of the evaluation program of the computer 11.

Based on the levels of the high-frequency receiving voltage and the pertaining coordinates of the measuring points a file is generated for every floor of the building. Then, the reference high-frequency received power level ($P_{rref}$ in dBm) is calculated by converting the $U_r$ values into high-frequency received power. The equation $$P_{rref}=U_r-107-G_t-G_r+a_r-10*\log(P_t/1 W)+10*\log(B/B_0) \quad (1)$$

describes a case where the transmitting and receiving antennae are lossfree and isotropic, the antenna supply line to the receiving antenna is lossfree and $P_t$=1 W. In (1), B refers to the 3-dB bandwidth of the GMSK-modulated transmitting signal in kHz.

The construction type of a building can be characterized by the construction substance of the exterior walls. It affects the electromagnetic wave propagation in the building. Radio coverage with an internal transmitter is predominantly used in larger public buildings, which are usually office or corporate buildings, institutions, department stores, etc. The following construction types are most frequently used for this type of building:

Reinforced concrete framework with masonry or reinforced concrete exterior walls. The facing consists of plaster or natural stone.

Masonry buildings (brick, sand-lime, gas concrete or pumice building stone) with or without plaster or with natural stone facing).

Most of the time, the glass surfaces in the exterior walls are not metallized by vapor deposition.

The results of the measuring method described by means of FIGS. 1 to 3 can be predicted with adequate accuracy by means of the approximation method of the invention. The aim in developing the method was to reduce the necessary initial parameters, i.e. the required building data, to a minimum. Therefore, the model can be used without an extensive building database.

According to the current status, the following building parameters are required for the approximation method:

building type width and length of the building between the insides of the exterior walls number and height of floors type of glazing The above listed information is usually found in the standard building specifications, which are available for all buildings.

The approximation of equation (1) is described below followed by the prediction of the high-frequency received power level, in general.

Tests have shown that $P_{rref}$ can be approximated with the following function of two real variables ($P_{ra}(x,y)$ in dBm)

$$P_{ra}(x,y)=s[(|x|-\max(x_1,|x_2|))^2+(|y|-\max(y_1,|y_2|))^2]-f \quad (2)$$

The image of equation (2) is an area in a three-dimensional space. The sectional planes which are parallel with the x, $P_{ra}$ coordinate planes, i.e. y=$y_j$=constant, generate sectional curves of the area. The sectional curves projected onto the x,$P_{ra}$ plane result in $P_{ra}(x,y_j)$:

$$P_{ra}(x,y_j)=s[(|x|-\max(x_1,|x_2|))^2+(|y_j|-\max(y_1,|y_2|))^2]-f \quad (3)$$

In equation (3), the absolute value of the independent variable |x| defines the absolute quantity of the distance from the transmitting antenna in direction x. The constant value $|y_j|$ refers to the absolute quantity of the distance from the transmitting antenna in direction y.

Figure 4:
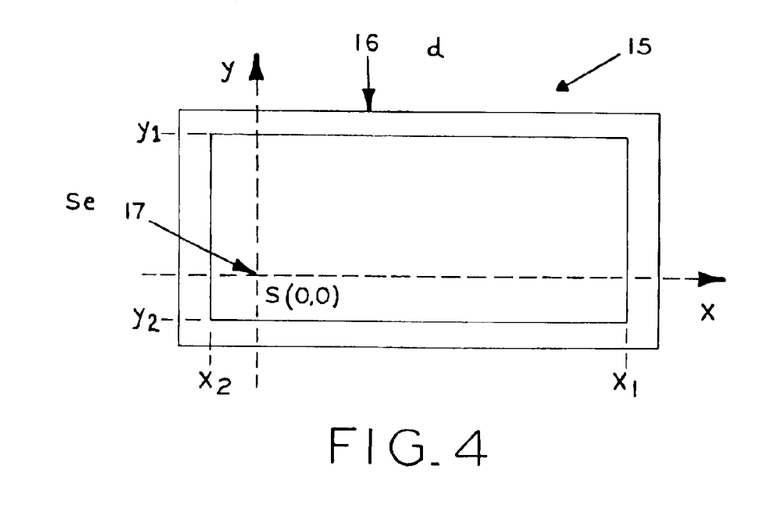
FIG. 4: horizontal cross-section of a floor of a building where the transmitting antenna S (0, 0) is positioned.
Figure 5:
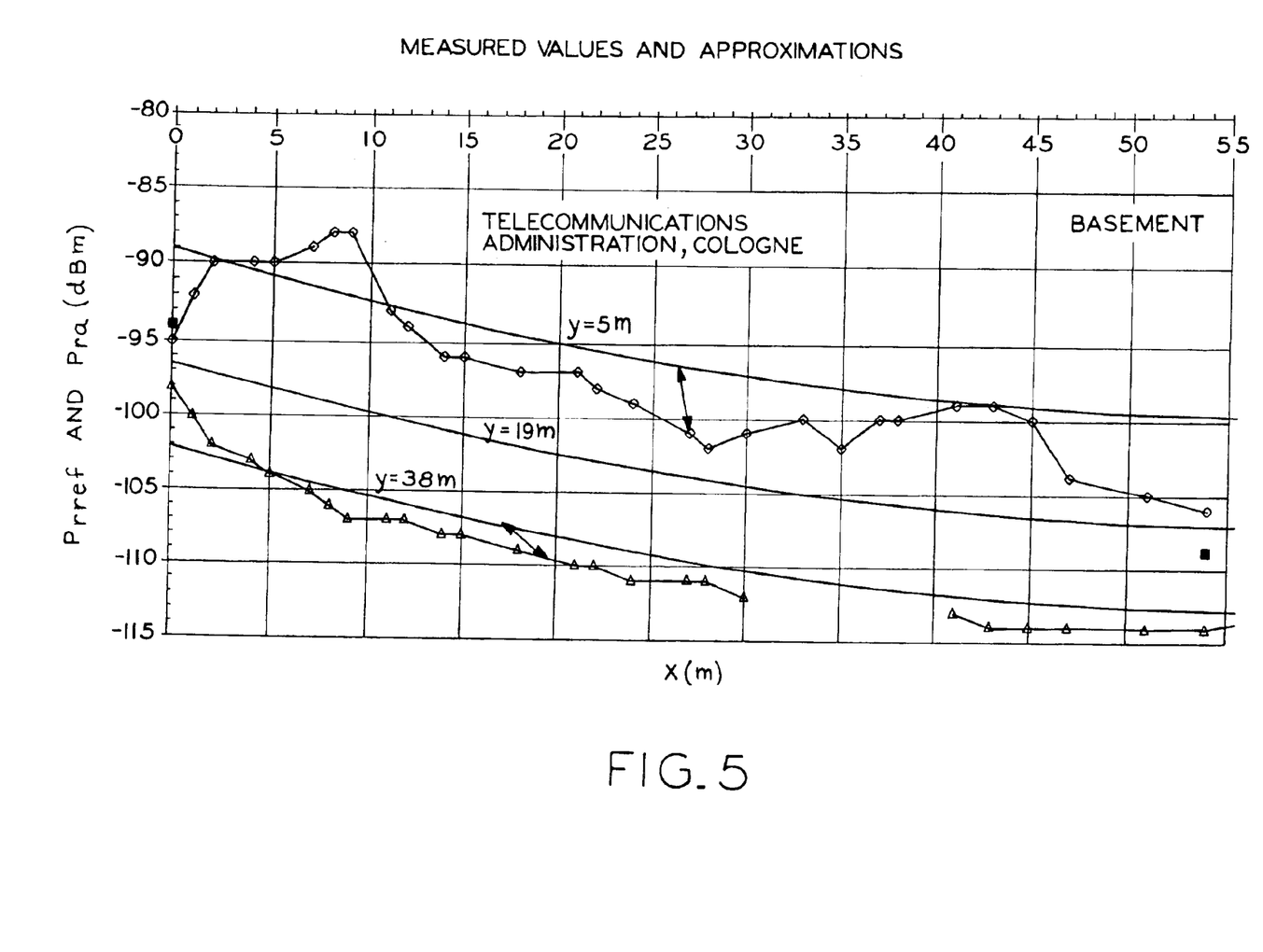
FIGS. 5 to 11: measured values of the high-frequency received power level and their approximation for various floors of a building.
Figure 6:
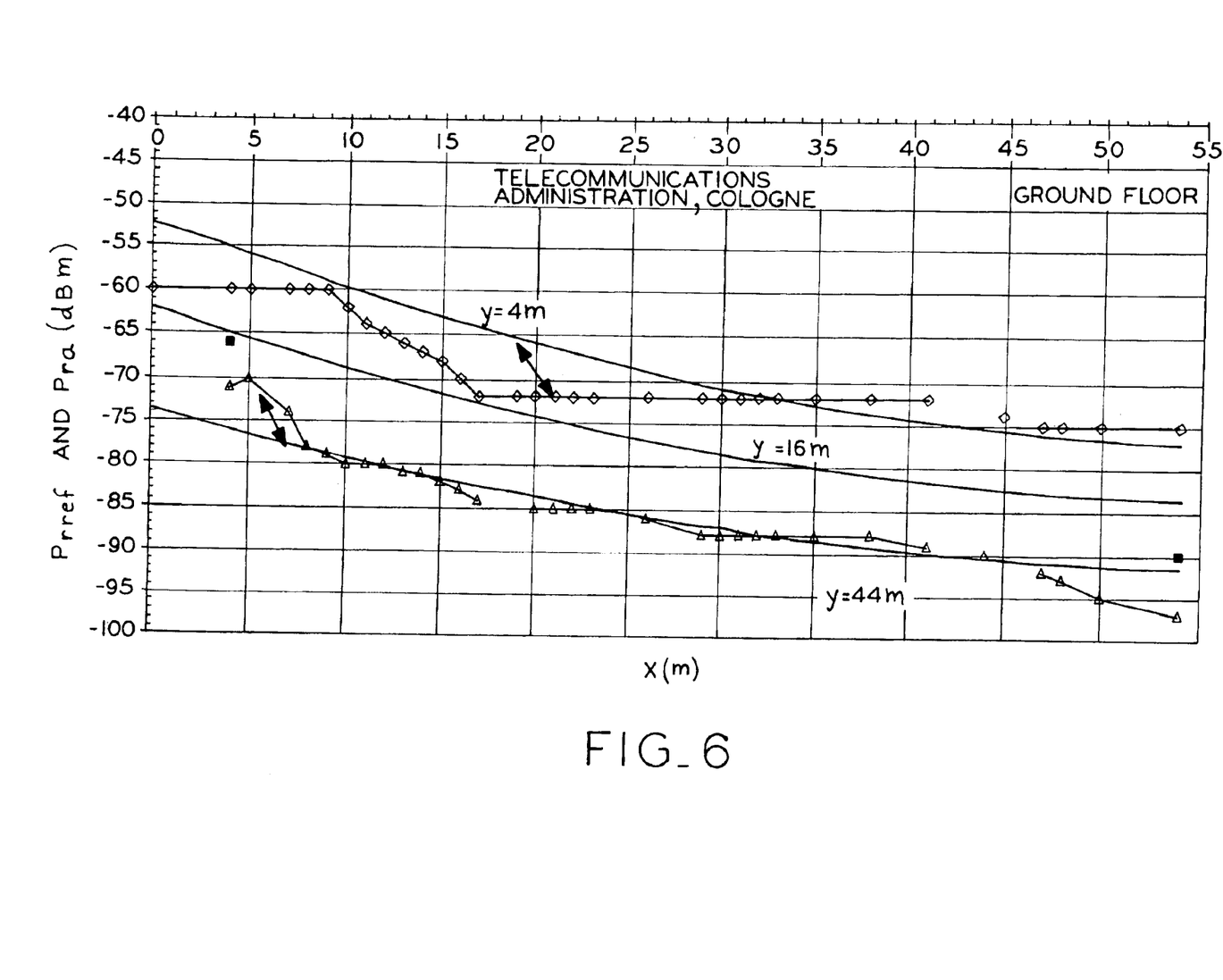
Figure 7:
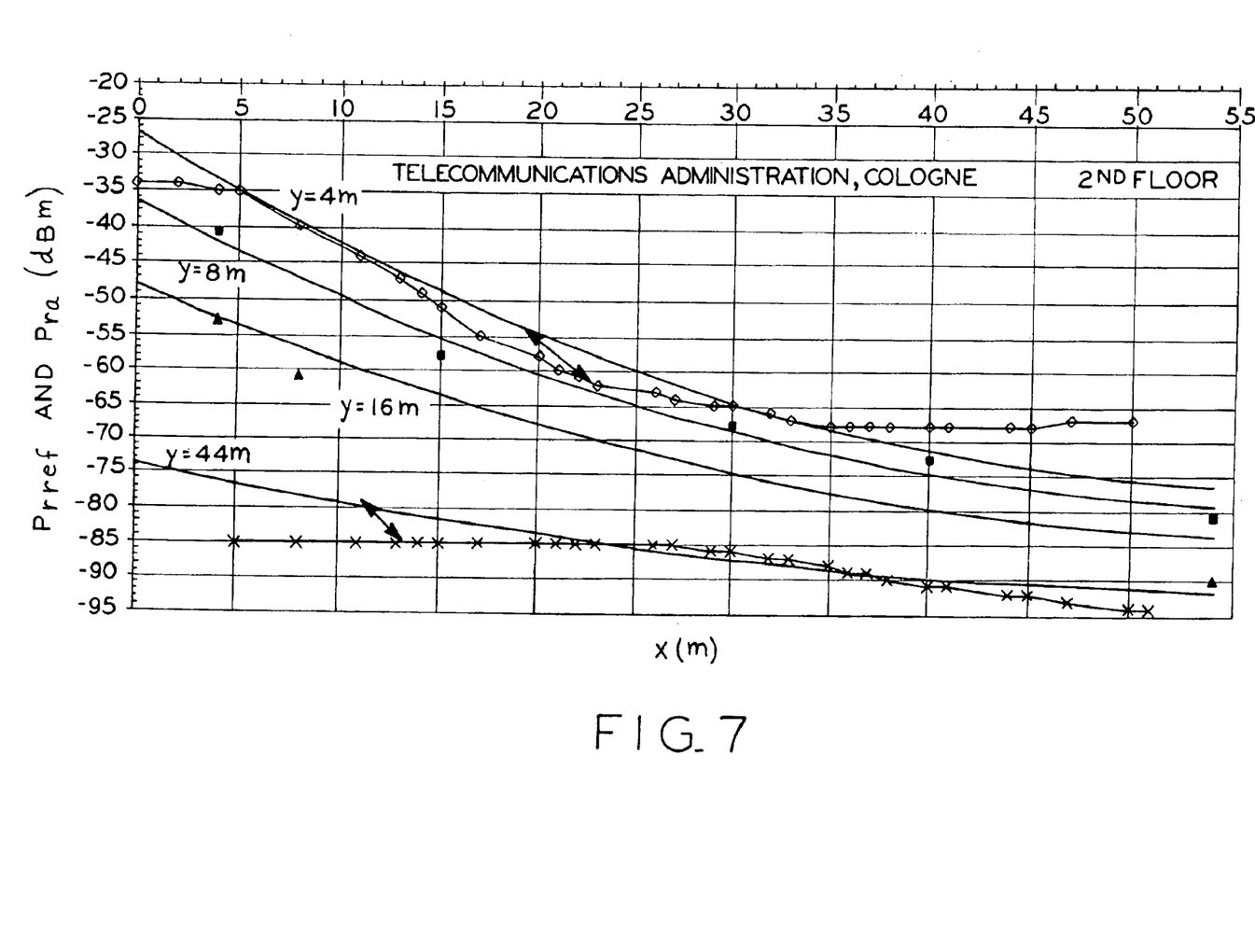
Figure 8:
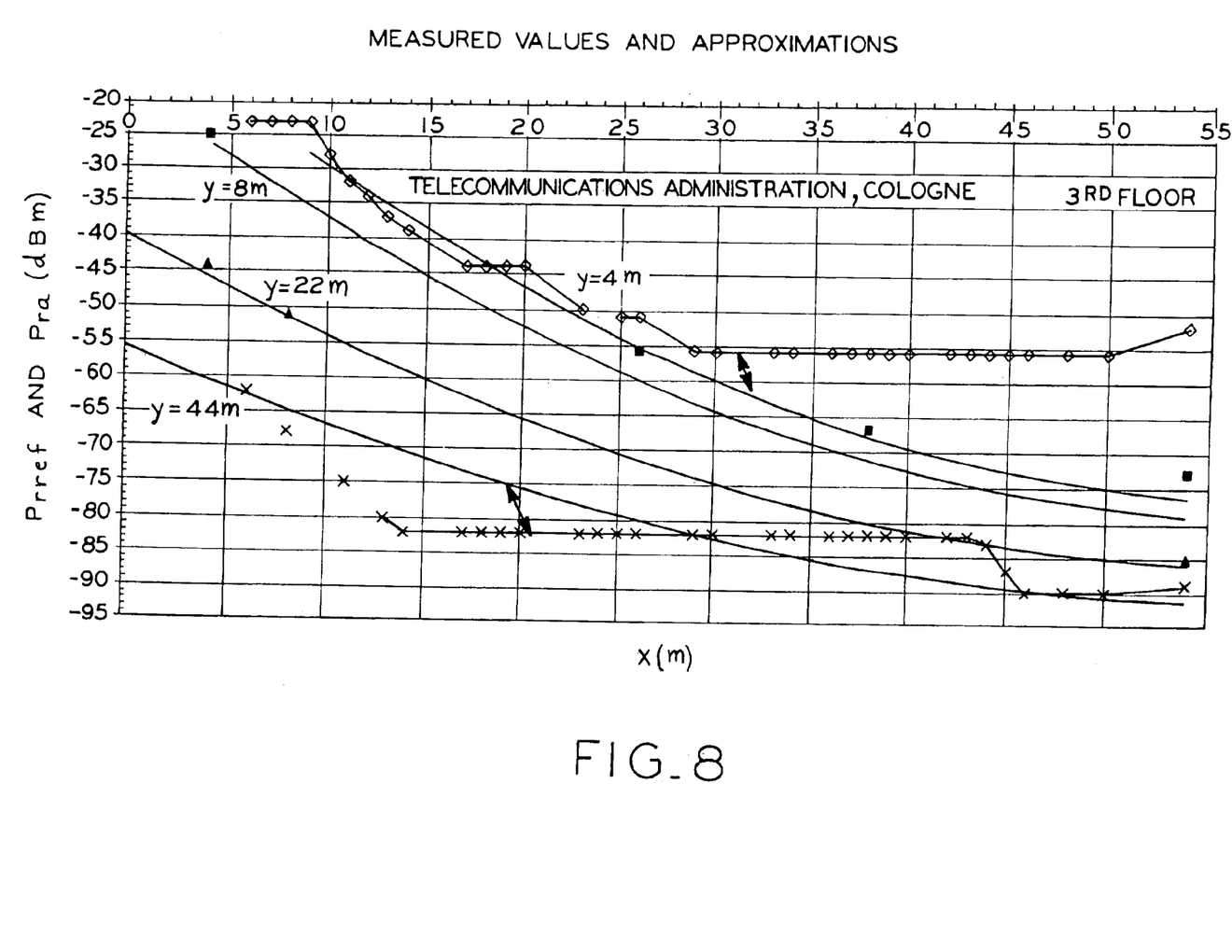
Figure 9:
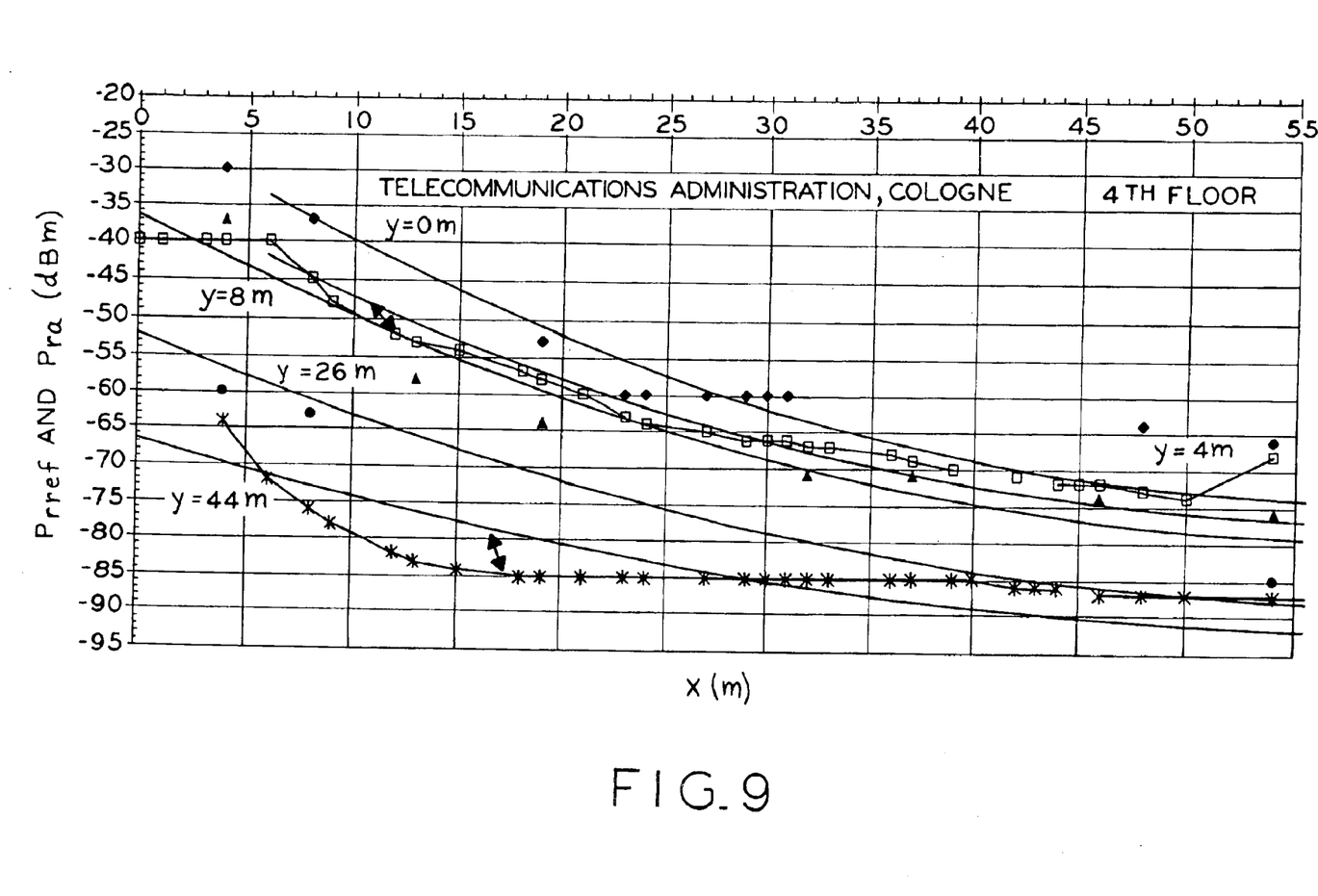
Figure 10:
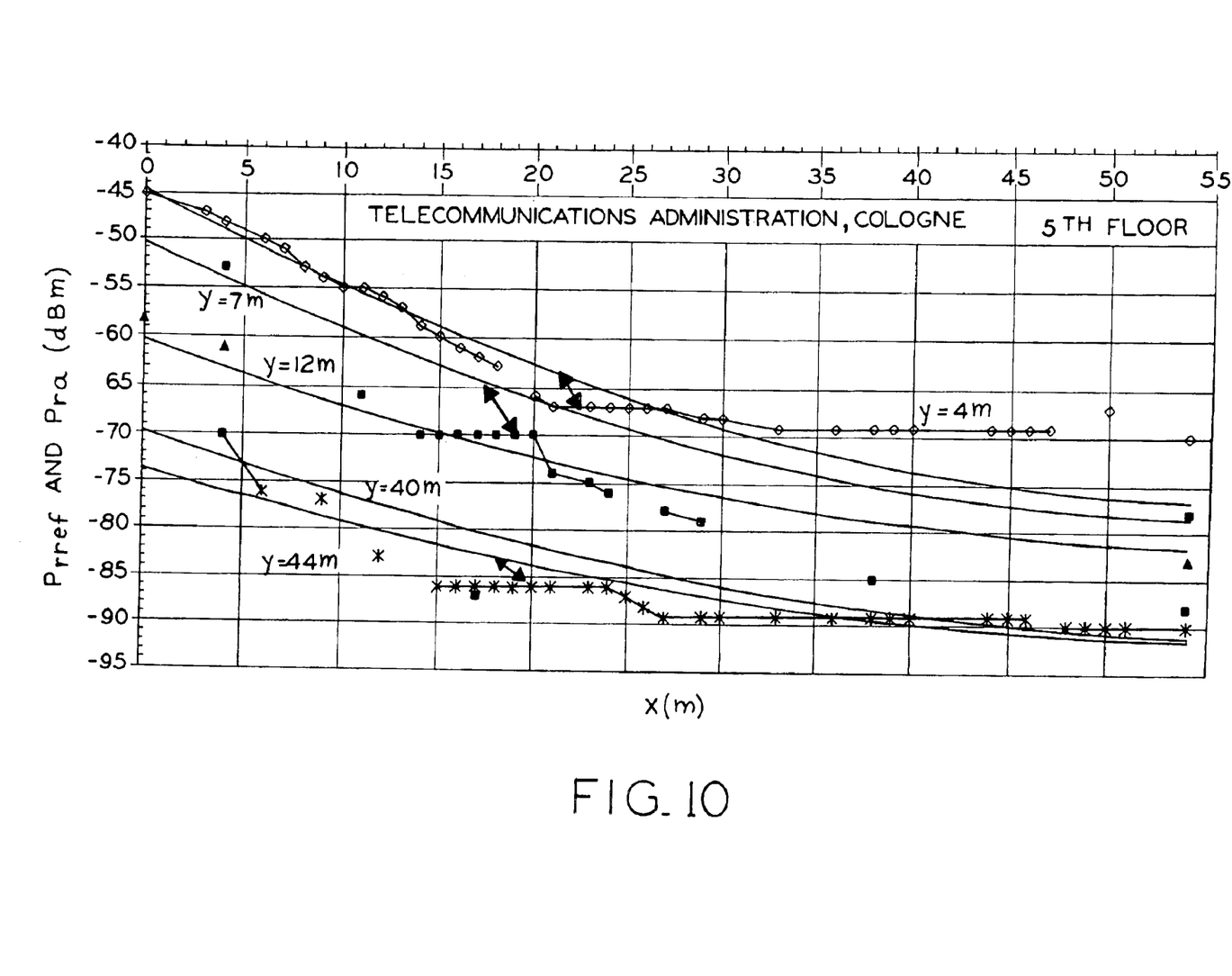
Figure 11:
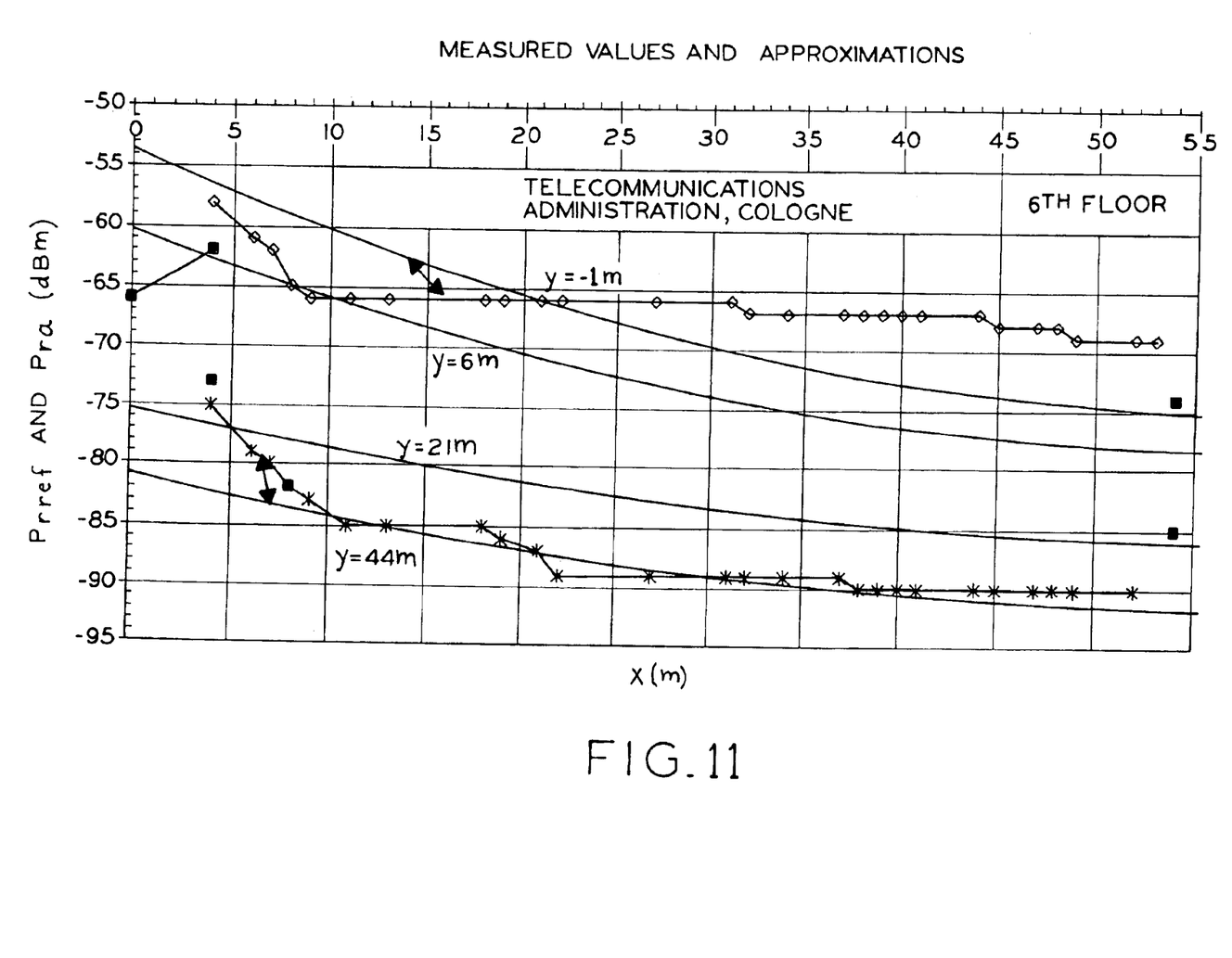

FIG. 4 illustrates the distances $x_1$, $x_2$, $y_1$, $y_2$ in meters from the transmitting antenna 17 at the origin of the rectangular coordinate system (x, y, $P_{ra}$) to the respective insides of the exterior walls 16 of the building 15.

In equation (3), s defines the slope of the approximation curves:

$$s=(5.2*10^{-3}/(\max(x_{max},y_{max})-10)-2.5*10^{-5})*(i-8.5)^4/(|y_j|+35)+0.002, \quad (4)$$

where $$x_{max}=\max(x_1,|x_2|) \text{ and } y_{max}=\max(y_1,|y_2|)$$

It is assumed that $x_{max}$ or $y_{max}$ is greater than 10 meters in accordance with actually existing building dimensions. Parameter i in equation (4) is used to number the floors. The reference floor, where the transmitting antenna is located, is i=0. The following floors above and below are defined as i=1, 2, to 5.

Function f in equation (3) causes a shift in the curve.

For the basement of a building:

$$f=1.07*10^{-2}*x_{max}*y_{max}+74 \quad (5)$$

For all other floors:

$$f=1.07*10^{-2}*x_{max}*y_{max}+63 \quad (6)$$

With $P_{ra}(x,y_j)$, the reference high-frequency received power level can be approximated anywhere on the floor under review.

Earlier, the approximation of $P_{rref}$ was defined by $P_{ra}(x,y_j)$. When $P_{ra}(x,y_j)$ is available, the power level on the receiver input ($P_r$ in dBm) can be calculated as follows $$P_r=P_{ra}(x,y_j)+G_t+G_r-a_r+10*\log(P_t/1 W) \quad (7)$$

with any power at the base of the transmitting antenna, for any antenna and antenna supply lines to the receiving antenna.

The size of the useful cell, i.e. the coverage area of the transmitting antenna, depends upon the parameters of the transmitter and receiver, which means the power at the base of the transmitting antenna ($P_t$ in W), the gain of the transmitting or receiving antenna ($G_t$ in dBi) or ($G_r$ in dBi) relative to the spherical source and the attenuation of the supply line to the receiving antenna ($a_r$ in dB). The gain of the transmitting antenna can be calculated based on the field patterns on the elevation and azimuth planes for any point $S(x,y)$ on the floor under review.

A comparison of the measured values with the approximation will follow by means of an example. The building specifications of the measured building of Direktion Telekom in Cologne and the positional data of the transmitting antenna are provided below. The transmitting antenna is located on the $3^{rd}$ floor. The object under review is a reinforced concrete framework building with exterior walls of lime sand brick.

| | |
|---|---|
| Building type: | reinforced concrete framework |
| Exterior walls: | lime sand brick |
| Building width (m): | 62.5 |
| Building length (m): | 52.5 |
| Number of floors: | 7 |
| Location of transmitting antenna: | $3^{rd}$ floor |
| $x_1$ (m): | 60 |
| $x_2$ (m): | -2.5 |
| $y_1$ (m): | 50 |
| $y_2$ (m): | -2.5 |

FIGS. 5 to 11 show the measuring results and their approximations for the building under review. Each figure shows selected measured values and approximation values for a certain floor of the building. Laid off as abscissa is the distance in direction x in meters from the transmitting antenna. Laid off as ordinate are the measured high-frequency received power values and the pertaining approximation values of the received power to be expected. The distance in direction y from the transmitting antenna is predefined for several values. The measured curves are identifiable by the marks for the measuring points. The approximation curves are drawn as clear lines without any marks. The curves that belong together are identified by double arrows.

The accuracy of the approximation is adequate for planning the radio coverage. The deviation between measured values and approximation values is usually less than ±10 dB on the ground floor EG and on the higher floors. The inaccuracy of the approximation in the basement UG may increase in certain cases, for example when many metal pipes are installed below the basement ceiling.

Definition of Symbols $a_r$ attenuation of the supply line to the receiving antenna
B 3-dB bandwidth of the GMSK-modulated transmitted signal
$B_0$ intermediate frequency bandwidth of the measuring receiver
f partial function in $P_{ra}(x,y)$
$G_r$ gain of the receiving antenna relative to the spherical source
$G_t$ gain of the transmitting antenna relative to the spherical source
i ordinal number of floors relative to the reference floor
$P_r$ power level at the receiver input
$P_{ra}$ approximation function of $P_{rref}$
$P_{rref}$ reference high-frequency received power level
$P_t$ power at the base of the transmitting antenna
S(0,0) position of the transmitting antenna at the origin of the Cartesian coordinate system (x=0, y=0)
s partial function in $P_{ra}(x,y)$
x distance from the transmitting antenna in direction x
$x_1$ distance from the transmitting antenna to the inside of the exterior building wall in positive x direction
$x_2$ distance from the transmitting antenna to the inside of the exterior building wall in negative x direction
y distance from the transmitting antenna in direction y
$y_1$ distance from the transmitting antenna to the inside of the exterior building wall in positive y direction
$y_2$ distance from the transmitting antenna to the inside of the exterior building wall in negative y direction
$U_r$ high-frequency receiving voltage level
$\lambda$ wavelength in the air

REFERENCE LIST 1 measuring generator
2 GSM generator
3 power amplifier
4 insulator
5 insulator
6 power meter
7 antenna
8 measuring receiver
9 measuring receiver
10 antenna
11 computer
12 distance pulse generator
13 multiplexer
14 digitizer tablet
15 building
16 exterior building wall
17 transmitting antenna

What is claimed is:

1. Method for planning mobile radio coverage inside a building to be covered, including the following steps:

position a virtual transmitting antenna with certain predefined transmitting parameters at any available location inside the building;

determine the size of the coverage area of the transmitting antenna inside the building by means of a prediction method for determining the high-frequency receiving level, where the size of the coverage area is predicted in that the high-frequency received power level $P_{ra}(x,y)$ to be expected at any points (x,y) of the building is determined by means of the following equation:

$$P_{ra}(x_i,y_j)=s[(|x_i|-\max{(x_1,|x_2|)})^2+(|y_j|-\max{(y_1,|y_2|)})^2]-f;$$

verify whether the determined coverage area or coverage areas cover(s) the entire building, and if so:

terminate the method;

if not:

increase the coverage area by changing the transmitting parameters of the virtual transmitting antenna;

and/or position at least one other virtual transmitting antenna at any place in the building remote from the location of the first antenna and determine the size of the coverage area of said other transmitting antenna inside the building by means of the prediction method; continue the method with step c) of the method.

2. Method as defined in claim 1, characterized in that for adapting the traffic capacity in the building, the coverage areas are changed by means of changing the transmitting parameters of the transmitting antenna(e) and by means of installing an additional virtual transmitter with transmitting antennae.

3. Method as defined by claim 2, characterized in that for using the prediction method at least the following building parameters are used:
building type
width and length of the building between the insides of the exterior walls
number and height of floors
type of glazing.

4. Method as defined by claim 3, characterized in that the method can be used for all common building types, especially reinforced concrete framework buildings and/or masonry buildings.

5. Method as defined by claim 4, characterized in that the partial functions s is defined as follows:

$$s=(5.2*10^{-3}/(\max(x_{max}, y_{max})-10)-2.5*10^{-5})* (i-8.5)^4/(|y_j|+35)+0.002,$$

where $$x_{max}=\max(x_1, |x_2|) \text{ and } y_{max}=\max(y_1, |y_2|).$$

6. Method as defined by claim 5, characterized in that the partial function f defined as follows
for the basement of the building:

$$f=1.07*10^{-2}*x_{max}*y_{max}+74$$

and for all other floors:

$$f=1.07*10^{-2}*x_{max}*y_{max}+63.$$

7. Method for calculating the high-frequency power level of a GSM base station transmitter disposed in a building on the receiver input of a mobile station inside the building using the following equation:

$$P_{ra}(x,y_j)=s[(|x|-\max(x_1, |x_2|))^2+(|y_j|-\max(y_1, |y_2|))^2]-f,$$

where $P_{ra}(x,y_j)$ indicates the high-frequency receiving level at any points s(x,y) inside the building for the floor on which the transmitter is located and several boors above and below said floor,
where the partial function s is defined as:

$$s=(5.2*10^{-3}/(\max(x_{max}, y_{max})-10)-2.5*10-5)* (i-8.5)^4/(|y_j|+35)+0.002,$$

wherein $$x_{max}=\max(x_1, |x_2|) \text{ and } y_{max}=\max(y_1, |y_2|)$$

and the partial function f is defined as:
$f=1.07*10^{-2}*x_{max}*y_{max}+74$, for the basement of the building, and
$f=1.07*10^{-2}*x_{max}*y_{max}+63$, for all other floors,
where the actual power level to be expected on the receiver input of the mobile station at any power at the base of the transmitting antenna, any antenna and antenna supply lines to the receiving antenna is calculated as follows:

$$P_r(x,y_j)=P_{ra}(x,y_j)+G_r(x,y_j)-a_r+10*\log(P_t/1 \text{ } W).$$

8. Method as defined by claim 1, characterized in that for using the prediction method at least the following building parameters are used:
building type
width and length of the building between the insides of the exterior walls
number and height of floors
type of glazing.

9. Method as defined by claim 8, characterized in that the method can be used for all common building types, especially reinforced concrete framework buildings and/or masonry buildings.

10. Method as defined by claim 8, characterized in that the partial function s is defined as follows:

$$s=(5.2*10^{-3}/(\max(x_{max}, y_{max})-10)-2.5*10-5)* (i-8.5)^4/(|y_j|+35)+0.002,$$

wherein $$x_{max}=\max(x_1, |x_2|) \text{ and } y_{max}=\max(y_1, |y_2|).$$

11. Method as defined by claim 1, characterized in that the method can be used for all common building types, especially reinforced concrete framework buildings and/or masonry buildings.

12. Method as defined by claim 1, characterized in that the partial functions is defined as follows:

$$s=(5.2*10^{-3}/(\max(x_{max}, y_{max})-10)-2.5*10^{-5})* (i-8.5)^4/(|y_j|+35)+0.002,$$

wherein $$x_{max}=\max(x_1, |x_2|) \text{ and } y_{max}=\max(y_1, |y_2|).$$

13. Method as defined by claim 2, characterized in that the partial function s is defined as follows:

$$s=(5.2*10^{-3}/(\max(x_{max}, y_{max})-10)-2.5*10^{-5})* (i-8.5)^4/(|y_j|+35)+0.002,$$

wherein $$x_{max}=\max(x_1, |x_2|) \text{ and } y_{max}=\max(y_1, |y_2|).$$

14. Method as defined by claim 3, characterized in that the partial function s is defined as follows:

$$s=(5.2*10^{-3}/(\max(x_{max}, y_{max})-10)-2.5*10^{-5})* (i-8.5)^4/(|y_j|+35)+0.002,$$

where $$x_{max}=\max(x_1, |x_2|) \text{ and } y_{max}=\max(y_1, |y_2|).$$

15. Method as defined by claim 1, characterized in that the partial function f defined as follows:
for the basement of the building:

$$f=1.07*10^{-2}*x_{max}*y_{max}+74$$

and for all other floors:

$$f=1.07*10^{-2}*x_{max}*y_{max}+63.$$

16. Method as defined by claim 2, characterized in that the partial function f defined as follows:

for the basement of the building:

$$f=1.07*10^{-2}*x_{max}*y_{max}+74$$

and for all other floors:

$$f=1.07*10^{-2}*x_{max}*y_{max}+63.$$

17. Method as defined by claim 3, characterized in that the partial function f defined as follows:

for the basement of the building:

$$f=1.07*10^{-2}*x_{max}*y_{max}+74$$

and for all other floors:

$$f=1.07*10^{-2}*x_{max}*y_{max}-63.$$

* * * * *

UNITED STATES PATENT AND TRADEMARK OFFICE
CERTIFICATE OF CORRECTION

PATENT NO. : 7,035,643 B2
APPLICATION NO. : 10/257016
DATED : April 25, 2006
INVENTOR(S) : Laslo Slawitschka et al.

It is certified that error appears in the above-identified patent and that said Letters Patent is hereby corrected as shown below:

Claim 1, Column 6, delete Line 54 and replace with:

--$P_{ra}(x,y_j) = s[ (|x|-\max(x_1, |x_2|))^2 + (|y_j|-\max(y_1, |y_2|))^2 ]-f$--;

Claim 5, Column 7, delete Line 29 and replace with:

--$x_{max} = \max(x_1, |x_2|)$ and $y_{max} = \max(y_1, |y_2|)$--.

Claim 6, Column 7, Line 32, insert --:-- after "follows"

Claim 7, Column 7, delete Line 44 and replace with:

--$P_{ra}(x,y_j) = s [ ( |x| - \max ( x_1, |x_2| ) )^2 + ( |y_j| - \max ( y_1, |y_2| ) )^2 ] - f,$--

Claim 7, Column 7, Line 49, delete "boors" and insert --floors--

Claim 7, Column 7, delete lines 52 and 53 and replace with:

--$s = (5.2*10^{-3} / (\max(x_{max}, y_{max})- 10) -2.5*10^{-5}) * (i-8.5)^4 / (|y_j| +35) +0.002,$--

Claim 7, Column 7, Line 55, delete "wherein" and insert --where--

Claim 7, Column 7, delete Line 56 and replace with:

--$x_{max} = \max(x_1, |x_2|)$ and $y_{max} = \max(y_1, |y_2|)$--

Claim 10, Column 8, delete Line 17 and replace with:

--$s = (5.2*10^{-3} / (\max(x_{max}, y_{max})-10)-2.5*10^{-5}) * (i-8.5)^4 / (|y_j|+35) +0.002,$--

Claim 10, Column 8, Line 20, delete "wherein" and insert --where--

Claim 10, Column 8, delete Line 21 and replace with:

--$x_{max} = \max(x_1, |x_2|)$ and $y_{max} = \max(y_1, |y_2|)$--.

Claim 12, Column 8, Line 34, delete "wherein" and insert --where--

UNITED STATES PATENT AND TRADEMARK OFFICE
CERTIFICATE OF CORRECTION

PATENT NO. : 7,035,643 B2
APPLICATION NO. : 10/257016
DATED : April 25, 2006
INVENTOR(S) : Laslo Slawitschka et al.

It is certified that error appears in the above-identified patent and that said Letters Patent is hereby corrected as shown below:

Claim 12, Column 8, delete Line 35 and replace with:

--$x_{max} = \max(x_1, |x_2|)$ and $y_{max} = \max(y_1, |y_2|)$--.

Claim 13, Column 8, Line 43, delete "where" and insert --where--

Claim 13, Column 8, delete Line 45 and replace with:

--$x_{max} = \max(x_1, |x_2|)$ and $y_{max} = \max(y_1, |y_2|)$--.

Claim 14, Column 8, delete Line 54 and replace with:

--$x_{max} = \max(x_1, |x_2|)$ and $y_{max} = \max(y_1, |y_2|)$--.

Signed and Sealed this

Twenty-fourth Day of October, 2006

JON W. DUDAS
*Director of the United States Patent and Trademark Office*